United States Patent
Su

(10) Patent No.: US 8,472,564 B1
(45) Date of Patent: *Jun. 25, 2013

(54) METHOD OF AUTOMATED DEMODULATION AND CLASSIFICATION OF PHASE-SHIFT-KEYING SIGNALS USING HYSTERETIC DIFFERENTIAL ZERO-CROSSING TIME SAMPLES

(75) Inventor: Wei Su, Englishtown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 33 days.

This patent is subject to a terminal disclaimer.

(21) Appl. No.: 13/437,336

(22) Filed: Apr. 2, 2012

Related U.S. Application Data

(63) Continuation of application No. 11/789,130, filed on Apr. 23, 2007, now Pat. No. 8,149,956.

(51) Int. Cl.
*H03D 3/00* (2006.01)

(52) U.S. Cl.
USPC ........... 375/334; 375/341; 375/324; 375/327; 375/330; 375/260; 714/775; 714/776

(58) Field of Classification Search
USPC .......................... 375/279, 330, 341, 324, 334
See application file for complete search history.

(56) References Cited

U.S. PATENT DOCUMENTS

| | | | |
|---|---|---|---|
| 6,094,450 A * | 7/2000 | Shockey | 375/141 |
| 6,396,869 B1 * | 5/2002 | Park et al. | 375/146 |
| 7,668,053 B2 * | 2/2010 | Haddad | 369/44.34 |
| 2006/0050805 A1 * | 3/2006 | Chen et al. | 375/295 |
| 2006/0274620 A1 * | 12/2006 | Haddad | 369/53.31 |

* cited by examiner

*Primary Examiner* — Eva Puente
(74) *Attorney, Agent, or Firm* — Stephen J. Harbulak

(57) ABSTRACT

An automatic zero-crossing signal demodulation and classification device for rapidly identifying unknown modulation in a signal identifies unknown modulation in a signal, demodulates differential phase shift keying signals and automatically recognizes certain phase shift keying signals. This is accomplished by eliminating unknown term $f_c$ in differential phase estimation, introducing a symbol rate tracking mechanism, applying hysteresis nonlinearity to eliminate phase shaping effect and using weighted average to estimate phase difference. Better estimates are accomplished by using hysteretic nonlinear function to detect zero-crossing points in eliminating false detecting of zero-crossing points caused by additive noise, and calculating differential phase without directly using center frequency to simplify estimation process. Present invention also encompasses automated zero-crossing signal surveillance demodulation and classification device for rapidly identifying unknown modulation in a signal and method for automatic zero-crossing demodulation and classification of unknown modulation signal.

18 Claims, 6 Drawing Sheets

METHOD OF AUTOMATED DEMODULATION AND CLASSIFICATION OF PHASE-SHIFT-KEYING SIGNALS USING HYSTERETIC DIFFERENTIAL ZERO-CROSSING TIME SAMPLES

GOVERNMENT INTEREST

The invention described herein may be manufactured, used, and licensed by or for the United States Government for governmental purposes without payment to me of any royalties thereon.

FIELD OF THE INVENTION

The present invention relates generally to the field of phase-shift keying signals and more particularly to the field of automated modulation classification of phase-shift-keying signals with a zero-crossing time sample technique.

BACKGROUND OF THE INVENTION

Automated modulation classification of signals is an extremely useful technique for both military and commercial communications equipment. In non-cooperative communications such as signal surveillance and some cognitive radio applications, the modulation scheme is unknown and has to be estimated and classified automatically. Continuing research and development has led to steady progress and advances in automated modulation classification techniques over the years. However, these techniques still suffer from a number of difficulties and limitations when being implemented in non-cooperative environments in the field, because of unknown parameters such as signal and noise power, carrier frequency and pulse shape, and so on. Those skilled in the art recognize that prior art signal classification equipment, techniques and methods need to be more robust in order to perform adequately in harsh environmental conditions.

One potentially promising technique is the zero-crossing approach, which should be relatively simple to implement, but to date has not yet been successfully accomplished. Recognizing phase-shift-keying (PSK) with a zero-crossing approach has only met with limited success.

A brief examination of the zero-crossing approach in signal repetition rate estimation points to a few of the most noteworthy difficulties with that approach. If we denote f(k), k=1, 2, . . . , as a digitized intermediate frequency (IF) copy of an unknown phase-shifted keying signal at time t(k), then denote a subset of t(k) as x(1), x(2), . . . which are zero-crossing samples of f(k), i.e. f(x(i))=0 for all i, and also denote $\phi(1), \phi(2), \ldots$ as phase symbols of f(k), then one can estimate the relative phase of f(k) at the $m^{th}$ symbol according to this expression:

$$\phi(m) = 2\pi f_c \left\{ \frac{1}{L_m} \sum_{n=j_m}^{j_m+L_m-1} \left[ x(n) - \frac{n}{2f_c} \right] \right\} \quad \text{Equation (1)}$$

where $f_c$ is the center frequency of f(k), $L_m$ is the number of zero-crossing samples within the $m^{th}$ symbol period, and x(n), n=$j_m$, $j_m$+1, . . . , $j_m$+$L_m$−1 are zero-crossing points within the $m^{th}$ symbol time-period. The underlying assumptions are that the symbol rate of f(k) is known, the symbol has a square pulse shape, the symbol timing is perfectly matched and that the center frequency is either previously known or can be estimated accurately. The differential phase of f(k), which is denoted by θ(m), is calculated by:

$$\theta(m) = [\phi(m) - \phi(m-1)] \bmod(2\pi) \quad \text{Equation (2)}$$

Then, the phase-shifted keying signal f(k) is classified by correlating the histogram of θ(2), θ(3), . . . , θ(M) with a number of known templates in order to determine the best match.

This prior art approach suffers from a number of drawbacks. The drawbacks include the need to know the center frequency $f_c$ accurately in Equation 1 in order to estimate $\phi$(m) and the need to conduct symbol estimation and symbol timing precisely in order to align the starting point x(j) and ending point x(j+$L_m$−1) within the desired symbol time-period in order to reliably detect zero-crossing points. Another drawback is the lack of reliability in detecting zero-crossing points due to the additive noise. If the zero-crossing points x(i)=t(a) are not detected due to noise, but points x(i+1)=t(b) are still detected in spite of the noise, then x(i)=t(b) will be mistakenly used in Equation 1 and consequently all further phase estimates after time t(a) will also be incorrect. The prior art approach also requires a square pulse shape, and if a square pulse shape is not available, then the zero-crossing points near the pulse edges will be dominated by noise and cause faulty detections. These kinds of limitations of the zero-crossing approach for signal repetition rate estimation devices and techniques along with long-standing prior art difficulties in modulated classification such as questionable strength in the face of harsh environmental conditions have created a long-felt need for a zero-crossing point estimating technique that is faster, more robust and more accurate than current zero-crossing modulation classification techniques. Up until now, there is no available zero-crossing demodulation and classification approach that overcomes the long-standing limitations, shortcomings and disadvantages of the prior art equipment and techniques.

SUMMARY OF THE INVENTION

In order to overcome the long-standing prior art drawbacks caused by need to solve the unknown center frequency, $f_c$, achieve perfect pulse timing estimation, the need for a square pulse shape, and the excessive sensitivity to noise in detecting zero-crossing points, the present invention provides automatic zero-crossing signal demodulation and classification device for rapidly identifying an unknown modulation in a signal. Despite the fact that the zero-crossing technique would be relatively simple to implement in classifying signals and is not a baseband constellation based system, the zero-crossing approach has not yet been successfully used for classifying signals.

Zero-crossing, or level crossing, time sampling, has often been used in numerous electronic applications such as frequency estimation, frequency-drift estimation, angular velocity estimation and signal modulation classification. The term "zero-crossing point" refers to the point where a periodic waveform varies from a positive value to a negative one and crosses the zero value in the process. This means that a waveform with only a positive or a negative value has no zero-crossing point, but if it varies up or down it may cross a given non-zero level, which is also known as the level-crossing point. Zero-crossing time estimation takes the average of the time differences between two zero-crossing points of a periodic function.

The present invention fulfills the long-felt need for a more rapid, robust and accurate estimating technique than prior art zero-crossing estimation techniques by providing automated demodulation and classification zero-crossing estimation devices and methods. This invention overcomes prior art problems by eliminating the unknown term $f_c$ in differential phase estimation, introducing a symbol rate tracking mechanism, applying hysteresis nonlinearity to eliminate the phase shaping effect and using a weighted average to estimate the phase difference.

It is an object of this invention to provide an automated demodulation and classification zero-estimating device for unknown modulation signals.

It is a further object of this invention to provide an automatic zero-crossing signal demodulation and classification device for rapidly identifying an unknown modulation in a signal that classifies and demodulates differential phase shift keying signals and automatically recognizes certain phase shift keying signals.

It is yet a further object of this invention to provide methods for automatically classifying the zero-crossing point by demodulating differential phase shift keying signals and automatically recognizing certain phase shift keying signals.

These and other objects are advantageously accomplished with the present invention providing an automated demodulation and classification zero-estimating device comprising a sample delay, differential phase estimator, symbol timing circuit, phase histogram, histogram templates and PSK modulation. Better estimates are accomplished by using the hysteretic nonlinear function to detect the zero-crossing points in eliminating the false detecting of the zero-crossing points caused by the additive noise, and calculating differential phase without directly using the center frequency to simplify the estimation process.

This invention's automated demodulation and classification zero-estimating approach demodulates M-ary differential phase shift keying (M-DPSK) signals and automatically recognizes M-DPSK and M-ary phase shift keying (M-PSK) signals. More rapid, robust and accurate estimates are achieved because the innovative techniques of the present invention eliminate the need to accurately estimate the center frequency, pulse shape and pulse timing, and they are therefore simpler and more rapid than prior art approaches. This invention's devices and methods advantageously optimize and improve the user's ability to estimate and classify unknown modulation schemes, which the prior art has not yet achieved with non-cooperative communications. The present invention also encompasses an automated zero-crossing signal surveillance demodulation and classification device for rapidly identifying an unknown modulation in a signal and a method for automatic zero-crossing demodulation and classification of an unknown modulation signal

DETAILED DESCRIPTION OF THE DRAWINGS

The automated demodulation estimating device of the present invention overcomes the problems, disadvantages and shortcomings of the prior art by eliminating the unknown term $f_c$ in differential phase estimation, introducing a symbol rate tracking mechanism, applying hysteresis nonlinearity to eliminate the additive noise effect and using a weighted average to estimate the phase difference in automated demodulation devices and methods. In accordance with the present invention, the digitized and band-pass filtered intermediate frequency (IF) signal f(k) 11 is defined as:

$$f(k) = \text{Re}\left\{ A_s e^{j\left(\frac{2\pi f_c k}{v_s} + \theta\right)} \sum_m \phi(m) p\left(\frac{k}{v_s} - \frac{m}{f_b}\right) + n(k) \right\} \quad \text{Equation (3)}$$

where $A_s$ is the amplitude, $\theta$ is the phase offset, $\phi(m)$ represents the symbol transmitted within the $m^{th}$ period, p(t) is the pulse shaping function and n(k) is the additive noise. The symbol sequence $\{\phi(m)\}$ is an independently identically distributed sequence, with its values drawn from a finite alphabet specific to each modulation format, where k=1, 2, ... are the time indices, $v_s$ is the given sampling frequency and $f_b$ is the symbol frequency which may be known, or can be estimated using existing techniques. Accordingly, $A_s$ and $\theta$ need not be known and $f_c$ does not need to be known precisely. In order to insure accuracy and resolution in the estimation techniques of the present invention, over-sampling is necessary; therefore one must assume that $f_c > 4 f_b$ and that set $f_s > 4 M f_c$ for an M-PSK modulated signal.

Figure 1:
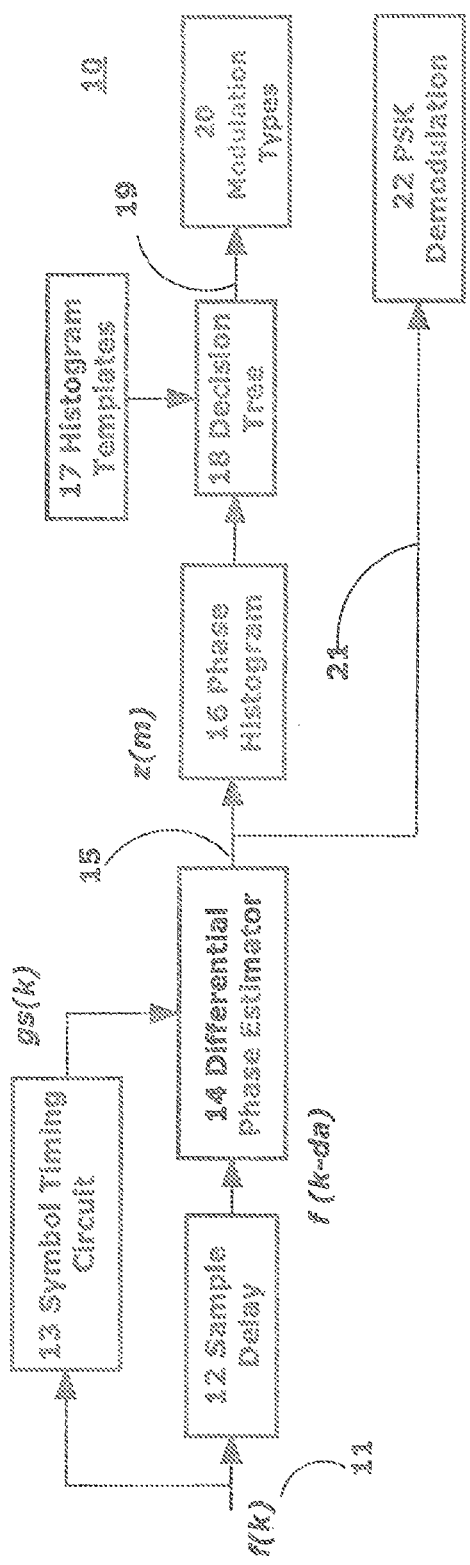
FIG. 1 is a conceptual block diagram of the automated demodulation devices of the present invention.

FIG. 1 is a conceptual block diagram of the automated demodulation devices of the present invention where the normalized differential phase of the digitized IF signal is calculated by the differential phase estimator and a symbol timing circuit is used to control the estimation process. In accordance with the present invention, when the symbol is coded by differential phase-shifted keying with a means for differential phase shift keying, then the symbol will be determined directly by the differential phase estimator. In either case, a histogram of the differential phase is formed to show the statistical patterns of the phase-shifted keying (PSK) or differential phase-shifted keying (DPSK). The automated modulation recognition of the present invention is accomplished by correlating the histogram with the known templates in order to find the best match.

Referring now to the drawings, FIG. 1 is a conceptual block diagram depicting a basic embodiment of the automatic zero-crossing signal demodulation and classification device for rapidly identifying an unknown modulation in a signal 10 of the present invention, comprising a normalized digitized IF signal f(k) 11 that is simultaneously sent to a sample delay circuit 12 and symbol timing circuit 13. The delayed (lower) branch of the IF signal f(k) is fed to a differential phase estimator 14. The symbol timing circuit 13 controls symbol timing and the overall estimation process. The symbol timing circuit 13 sends a symbol timing input to the differential phase estimator 14. The differential phase estimator 14 demodulates the signals by DPSK with the differential phase-shift-keying means and provides a differential phase output 15. If the symbol is coded by DPSK, then the symbol will be determined directly by the differential phase estimator 14. An estimated phased histogram 16 is formed by a means for generating an estimated phase histogram to show the statistical patterns of the phase shift keying or DPSK modulation types and to determine types of modulation by comparing the histogram of an unknown signal to the known histogram templates stored in a histogram storage module 17. A means for histogram comparison 18 performs automated modulation recognition by correlating the estimated phased histogram 16 with stored templates from the histogram template module 17 in order to find the best match. Afterwards, the histogram comparison means 18 provides a comparison output 19 to a modulation type module 20. The signal 21 can also be sent directly to the PSK demodulation circuit 22.

Figure 2:
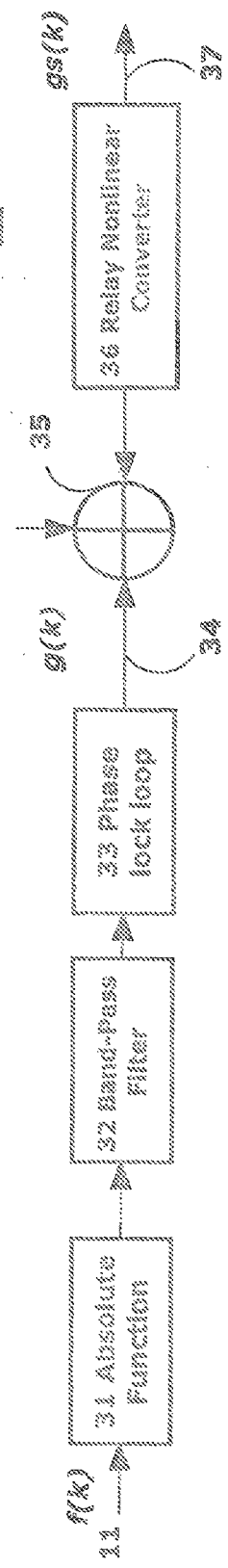
FIG. 2 illustrates an example of symbol timing.

The symbol timing circuit 13 may be implemented by using an existing algorithm or the circuit depicted in FIG. 2. Referring now to FIG. 2, there is illustrated an example of the symbol timing circuit 13. The normalized digitized IF signal f(k) 11 is converted to give an absolute function value 31 that is fed through a narrow band-pass filter 32 and phase lock loop 33 to obtain a sinusoidal signal g(k) 34 according to this expression:

$$g(k) \approx A_f \sin\left(2\pi \frac{k f_b + d_f}{v_s}\right). \quad \text{Equation (4)}$$

where $A_f$ is the amplitude of sinusoidal signal g(k) 34, and $d_f$ is the order of the digital band-pass FIR filter 32. The sinusoidal signal g(k) 34 is shifted by a means for DC bias, $b_{DC}$, 35 which could be an adder, and a relay nonlinear converter 36, which results in converting the digitized IF signal f(k) 11 into a square waveform output $g_s(k)$ 37. The square waveform output $g_s(k)$ 37 is depicted in more detail in FIG. 3 and the relay nonlinear function of the relay nonlinear converter 36 is depicted in greater detail in FIG. 4. The purpose of using square waveform is to establish starting and ending time marks for counting the zero-crossing time differences.

Figure 3:
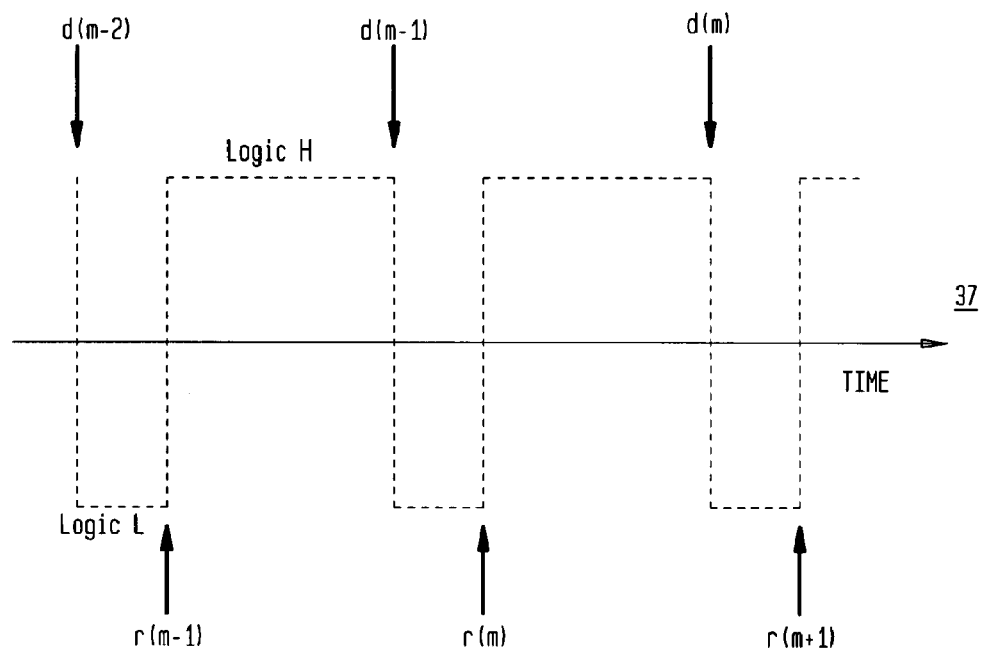
FIG. 3 illustrates a timing signal $g_s(k)$.

Referring now to FIG. 3, the square waveform output $g_s(k)$ 37 is represented by two logic states: H and L, depending upon the polarity of the sinusoidal waveform g(k) 11. The average number of zero-crossing points over $L_s$ number of symbols is defined, as follows:

$$k_{cb} = \frac{1}{L_s} \sum_{m=1}^{L_s} k_{cb}(m) \quad \text{Equation (5)}$$

where $k_{cb}(m)$ is the number of zero-crossing points in the $m^{th}$ symbol and the value of $k_{cb}(m)$ does not need to be known in implementation. The DC bias means 35 is given by the expression $$b_{DC} = A_{fa} \sin\left(\pi \frac{k_{cb} - N_a}{k_{cb}}\right),$$

which is a constant number used to manipulate the shape of $g_s(k)$, and $A_{fa}$ is the time average of $A_f$, $N_a = \lfloor K_{cb} \rfloor - 2\beta$ is an integer, $$\beta < \frac{\lfloor K_{cb} \rfloor}{2}$$

is a positive integer which is determined by user to eliminate the pulse shape effect, and operator $\lfloor x \rfloor$ represents rounding the element x to the nearest integers towards minus infinity. Since the pulse shape is usually unknown, the expression $$\beta = \min\left(2, \left\lfloor \frac{\lfloor K_{cb} \rfloor - 1}{2} \right\rfloor\right)$$

will be used as the default value. The times of the rising edges of $g_s(k)$ are represented by a time sequence r(m) and the falling edges of $g_s(k)$ are represented by a time sequence d(m), m=1, 2, . . . , as shown in FIG. 3.

Figure 4:
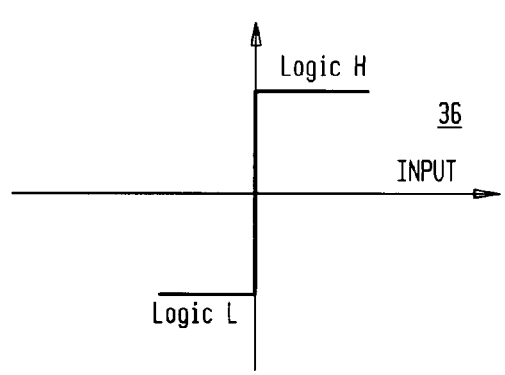
FIG. 4 depicts a function of the relay nonlinear converter in accordance with the present invention.

In FIG. 3, r(m−1), r(m) and r(m+1) are time indices of rising edges of the signal and d(m−1), d(m) and d(m+1) are time indices of the signal's falling edges. FIG. 4 depicts a function of the relay nonlinear converter 36. The logic state H will be given if the input value of the converter 36 is larger than or equal to zero and the logic state L will be given if the input value is less than zero.

Referring back to FIG. 1, the differential phase estimator 14 is implemented by calculating the time difference between two zero-crossing samples where the center frequency $f_c$ is unknown. The IF signal f(k) 11 is converted to a rectangular waveform $f_s(k)$ with a time delay of $\delta = \sin^{-1}\alpha$ by using a hysteresis nonlinear converter 51 as is shown in FIG'S 5 and 6. The threshold $\alpha = \sqrt{N_0}$ can be chosen based on the noise power $N_0$. A time delay $d_a$ is inserted into the signal path so that the zero-crossing points of the timing waveform g(k) will be synchronized with the edges of the symbol pulses of the signal $f_s(k)$. The desired time delay is calculated according to the formula:

$$d_a = \begin{cases} d_{fs} & \text{if } d_f \geq d_s \\ \text{round}(v_s / f_d) - d_{fs} & \text{if } d_f < d_s \end{cases} \quad \text{Equation (6)}$$

where $$d_{fs} = \text{rem}\left((d_f - d_s), \text{round}\left(\frac{v_s}{2 f_b}\right)\right) \quad \text{Equation (7)}$$

and where $d_s = \lfloor \delta f_s \rfloor$ is the number of samples that are delayed in the signal path. The operator round(x) means to round x to the nearest integer and the operation of z=rem(y, x) gives the remainder z after the division of y/x. When x(m, 1), x(m, 2) . . . , x(m, N) are $N_m$ number of zero-crossing points within the $m^{th}$ symbol time-period and $g_s(k)$=H, then the $m^{th}$ differential phase can be estimated according to the expression:

$$y(m) = 2\pi \cdot k_{cb} f_b \cdot \sum_{n=1}^{N_m} w(n)[x(m, n) - x(m-1, n)] \quad \text{Equation (8)}$$

where w(n) is the weight determined by the pulse shape and $$\sum_{n=1}^{N_m} w(n) = 1.$$

In general, the samples near the center of the pulse are less affected by pulse shape so that they receive a larger weight. The weights are determined by the user and the default value $w(n)=1/N_m$ will be used for all n. Defining $u(m, n)=f_s[x(m, n)-x(m-1, n)]$ as the number of zero-crossing points between $x(m)$ and $x(m-1)$, and $N_m$ as the number of zero-crossing points between $r(m)$ and $d(m)$ results in changing Equation 5 to read as follows:

$$y(m) = \frac{2\pi \cdot k_{cb} f_b}{v_s} \cdot \sum_{n=1}^{N_m} w(n)u(m, n) = K_y \sum_{n=1}^{N_m} w(n)u(m, n) \quad \text{Equation (9)}$$

where the expression:

$$K_y = \frac{2\pi \cdot k_{cb} f_b}{v_s} \quad \text{Equation (10)}$$

is the normalization factor and is a fixed value in the given time frame. The normalized differential phase is described as follows:

$$z(m) = \frac{y(m)}{K_y} = \sum_{n=1}^{N_m} w(n)u(m, n) \quad \text{Equation (11)}$$

Figure 5:
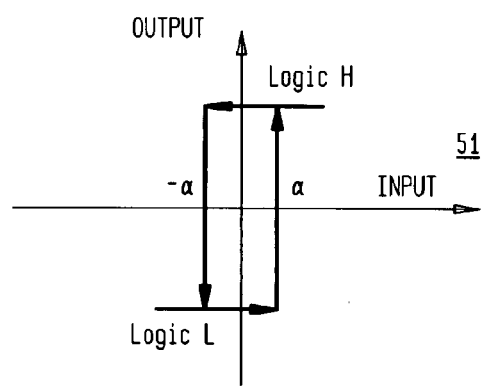
FIG. 5 depicts a function of the hysteresis nonlinear converter in accordance with the present invention.
Figure 6:
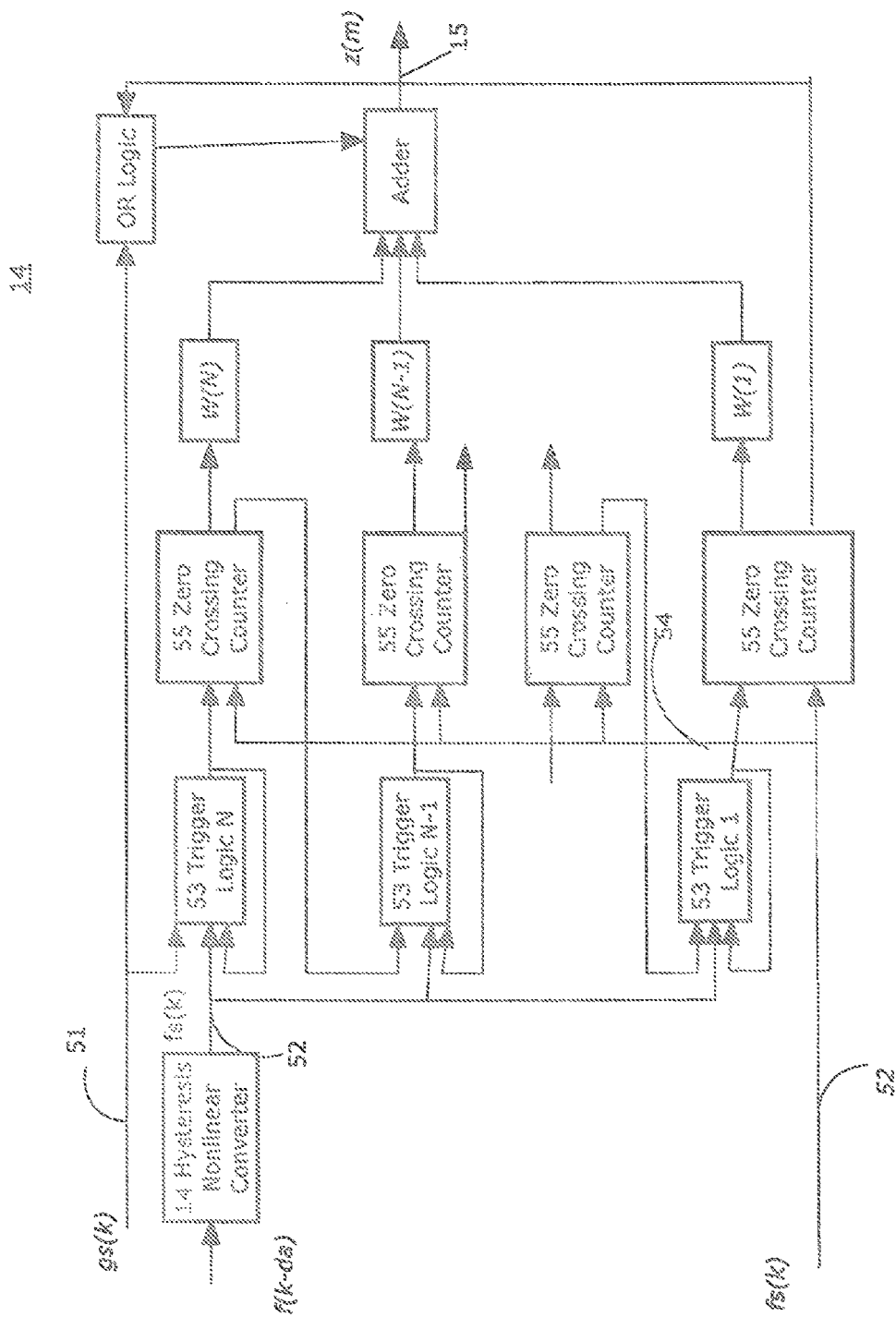
FIG. 6 is a conceptual diagram of an automated demodulation classification device in accordance with the present invention.

FIG. 5 also illustrates the function of the hysteresis nonlinear converter 51 that is depicted in the FIG. 6 hardware implementation. FIG. 5 illustrates the point that while the input increases, if it is larger than or equal to α, then logic state H will be obtained, and if the input is less than α, then logic state L will be obtained. Additionally, while the input signal is decreasing, if the input is less than or equal to −α, the logic state L will be obtained and if it is larger than −α, the logic H will be obtained.

FIG. 6 depicts this invention's automated demodulation classification device, and illustrates in more detail the operation of the differential phase estimation module 14 of the basic FIG. 1 automated demodulation estimator 10. The computation of zero-crossing points $K_{cb}$ in Equation 9 can be performed by the zero-crossing counter 55, as further depicted in FIG'S 7 and 8. Those skilled in the art will readily see that accuracy of symbol timing synchronization is not required for estimating the average number of zero-crossing points per symbol $K_{cb}$ because the average value over $N_f$ symbols are used. In the interests of a simpler design than complex prior art equipment, a constant number $N \leq \min(N_m)$ is chosen as the number of parallel paths for the diagram, which allows simplifying Equation 11, as follows:

$$z(m) = \sum_{n=1}^{N_m} w(n)s(m, n) \quad \text{Equation (12)}$$

Figure 9:
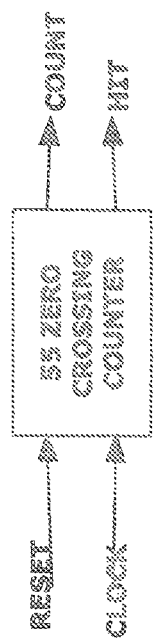
FIG. 9 is a chart defining the symbol for the trigger logic circuit in accordance with the present invention.

Referring now to FIG. 6, the digitized RF signal f(k) 11 from the FIG. 1 conceptual block diagram 10 is converted to rectangular waveform $f_s(k)$ 52 by the hysteresis nonlinear converter 14 with the logic state H or L being sent to a group of N number of trigger logic circuits 53. FIG. 9 illustrates inputs $a_1$, $a_2$, and $a_3$ and output b of a trigger logic circuit 53. The inputs and outputs of the trigger logic circuit 53 are either in the logic state H or L.

Starting with the trigger logic circuit 53 and resetting all the trigger logic outputs to L, when both the rectangular waveform $f_s(k)$ 52 and digitized RF signal $g_s(k)$ 51 are in logic state H, the trigger signal 54 of trigger logic circuit 53 will be logic state H and the output of the trigger logic circuit 53 will be b=H and will feed back to the input $a_3$ to lock the signal 54 of trigger logic circuit 53 to H. When both rectangular waveform $f_s(k)$ 52 and digitized RF signal $g_s(k)$ 51 are in logic state L, the signal 54 will be logic state L and the output b=L will feed back to the input $a_3$ to lock the signal 54 to L, which results in the trigger signal 54 being sent to a number of zero-crossing counters 55.

In operation, the zero-crossing counter 55 is reset to zero by the raising edge of the trigger signal 54, logic state H, and starts to count the number of clock pulses s(m, 1). When the output of the zero-crossing counter 55 is larger than zero, the zero-crossing counter 55 "Hit" port of FIG. 8 outputs a logic state H to enable an additional trigger logic circuit 53 and also count the number of zero-crossings s (m, 2). Therefore, the number of zero-crossings u(m,n), n=1, 2, ..., N, is counted in order, shifted, weighted, and added to form the normalized differential phase output z(m) 15.

Figure 8:
FIG. 8 is a chart defining the symbol for the zero-crossing counter in accordance with the present invention.

FIG. 8 depicts the symbol of the zero-crossing counters 55 as having four ports: Reset, Clock, Count and Hit. The output is held to its most recent value between triggering events and will reset the zero-crossing counter 55 to its initial state when the trigger event is received at the Reset input. When trigger events are received simultaneously at the "Clock" and "Reset" ports, the zero-crossing counter 54 is first reset, and then increases or decreases, as appropriate. The "Count" port produces the current value of the zero-crossing counter 54 as a sample-based scalar with the same sample period as the inputs. The "Hit" port produces zeroes while the value of the counter value is equal to zero and produces one when the counter value is larger than zero.

Referring back to FIG. 6, the histogram of the normalized differential phased outputs z=(m), m=1, 2, ..., L, can be calculated using standard statistical approaches. M histogram peaks will be observed for M-PSK and M-DPSK modulated signals and one peak will be observed for a carrier. Those peaks are used for recognizing different modulation types. The histogram templates from the FIG. 1 histogram storage module 17 are used for automatic modulation recognition by correlating normalized differential phases to known templates. The histogram templates may be formed with the current method described by Hsue and Soliman and should then be normalized using the factor $K_y$. It is noted that if an automated histogram normalization procedure is used, the calculation of $K_y$ can be omitted. The histogram of the unknown signal will be correlated to $N_t$ number of known templates to result in $N_t$ number of correlation scores. Since each score is associated with a known modulation type, the highest score indicates a recognition result. A threshold is chosen to exclude the low confidence results. If a score is below the threshold, the classification is reported as failure.

Figure 7:
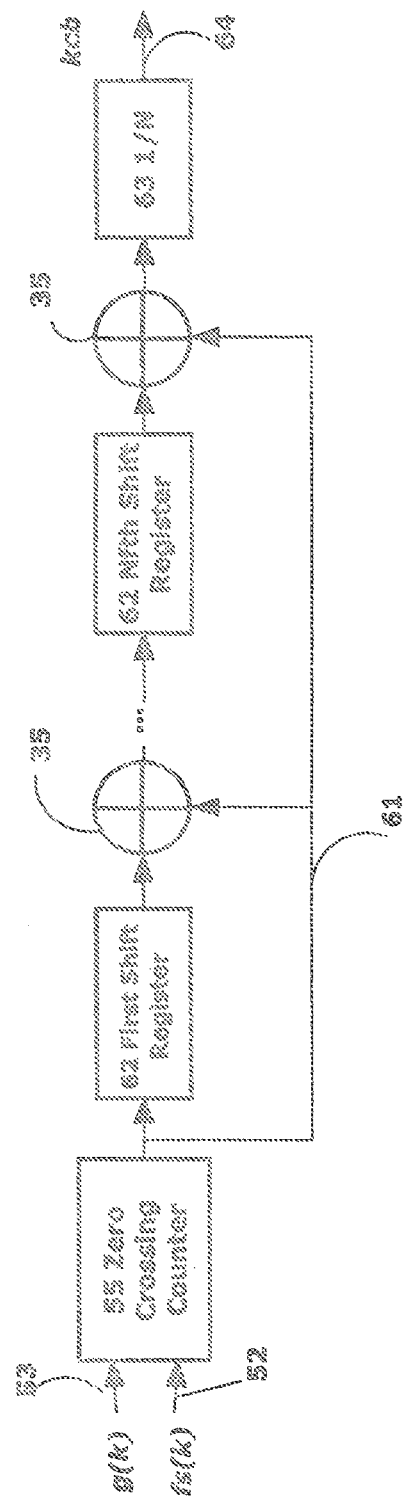
FIG. 7 is a block diagram for estimating the average number of zero-crossings in accordance with the present invention.

FIG. 7 is a block diagram for estimating the average number of zero-crossings using the zero-crossing counter 55 of the present invention. A sinusoidal symbol timing signal g(k) signal 53 from the FIG. 2 phase loop lock 33 is used to reset the zero-crossing counter 55. The rectangular waveform $f_s(k)$ 52 is also sent to the zero-crossing counter 55 in order to provide the zero-crossing input. A zero-crossing count output 61 is sent to a group of shift registers 62 and adders 35 in order to count and average the number of zero crossing points per symbol $k_{cb}$ output 64, which is used by Equation 10. It should be noted that if an automated histogram normalization procedure is used, the calculation of $k_{cb}$ is not needed.

FIG. 9 depicts the symbols for the trigger logic circuit 52. The logic relation between input and output is defined in Truth Table 1.

Figure 10:
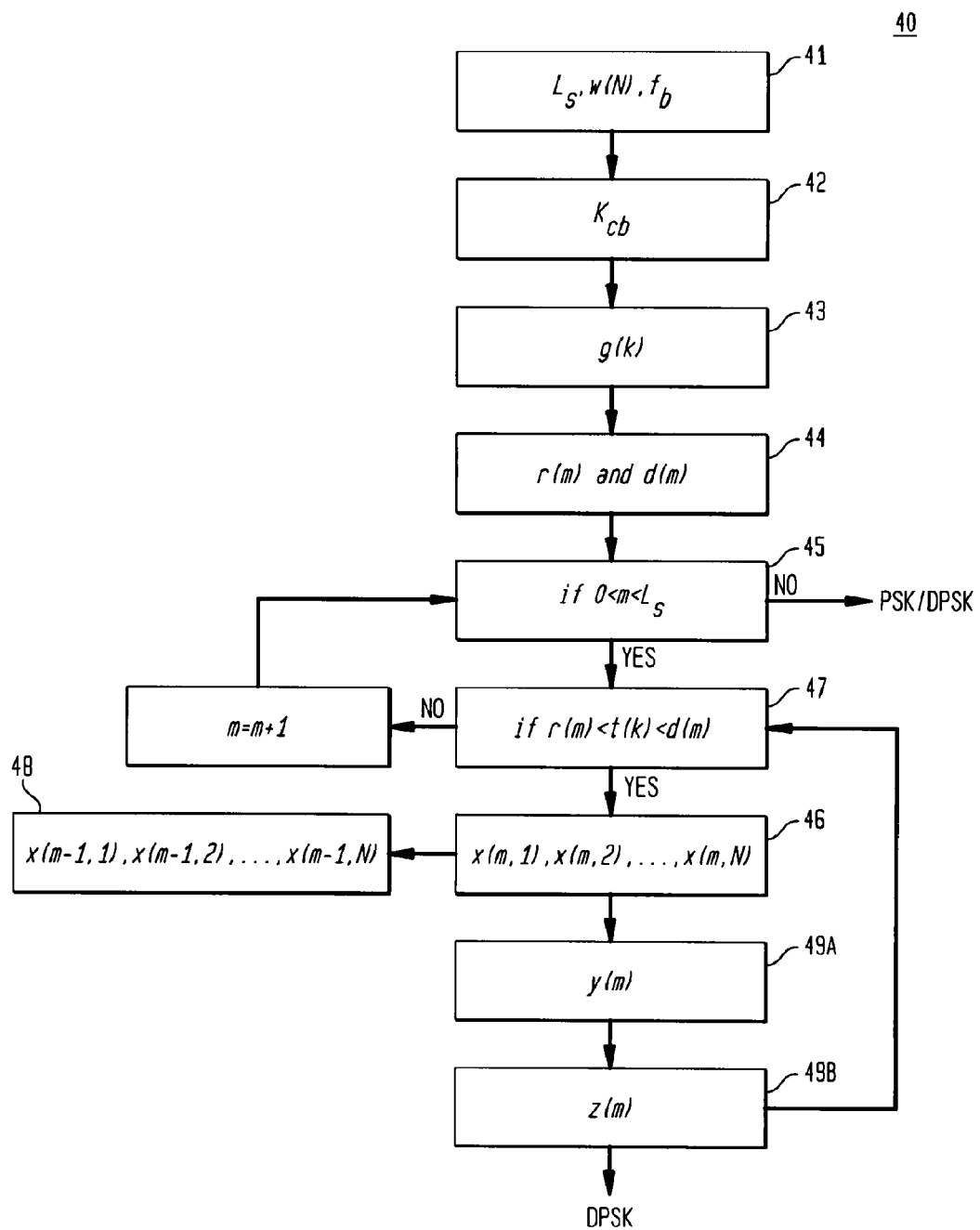
FIG. 10 is a software flow diagram depicting the operation of the automated demodulation classification software and methods of the present invention.

The present invention also includes a software embodiment for automatic demodulation and classification of phase shift keying signals with hysteretic differential zero-crossing time samples. FIG. 10 is a flow chart depicting the operation of this software embodiment. Referring now to FIG. 10, for a given N, there is depicted a means for inputting known variables, represented by box 41, where values for the $L_s$, weight w(N), and symbol frequency $f_b$ are given as known inputs. A first software calculating module, represented by Box 42, calculates the average number of zero-crossing points per symbol $k_{cb}$. Notice that if an automated histogram normalization procedure is used, the calculation of $k_{cb}$, is not needed. Box 43 represents a means for generating a timing signal g(k), which is then used in an index determining module, represented by Box 44 to determine timing indices r(m) and d(m). Phase-shifting classification occurs in a means for phase-shifting classification, Box 45. $L_s-1$ number of symbols is used in calculations which are regulated by an index m. In those cases where m equals $L_s$, the zero-crossing calculation is completed and the calculation result is delivered for PSK/DPSK classification with PSK denoting phase-shift keying and DPSK denoting differential phase-shift keying by a means for differential phase-shift keying. However, in those cases where m is less than $L_s$, but the time variable t(k) in block 47 is beyond the indices r(m) and d(m), the index m increases by one unit. Otherwise, if the inequality condition in block 47 is satisfied, a counting module, represented by box 46, counts the number of zero-crossings N and the number of zero-crossing times x(m, 1), x(m, 2), . . . , x(m,N). In a saving module, represented by box 48, the last zero-crossing times x(m−1, 1), x(m−1, 2), . . . , x(m−1, N) are saved for the further computation. A differential phase y(m) is calculated in a second calculating module, represented by Box 49A, and value z(m) is calculated in a third calculating module, represented by Box 49B, based on a number of symbols $L_s$, weight w(N), symbol frequency $f_b$, and the last and current zero-crossing times counted in the saving step represented by Box 48, which results in a DPSK demodulation output.

Figure 11:
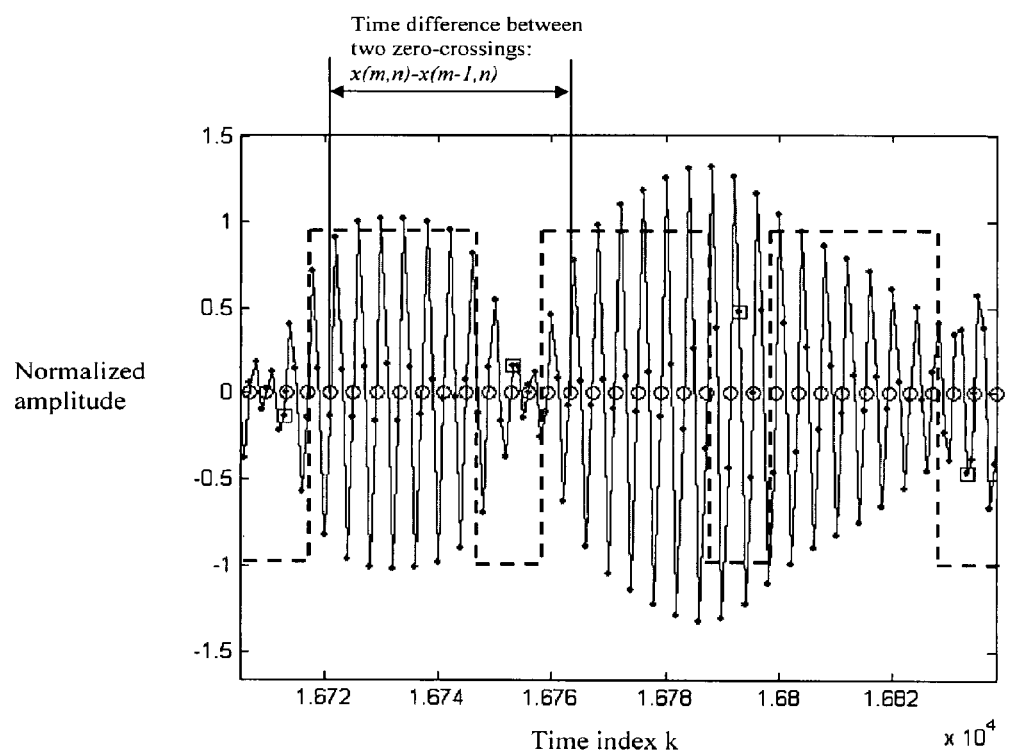
FIG. 11 is a chart illustrating an example of a QPSK signal in accordance with the present invention; and Table 1 is the truth table for the trigger logic in accordance with the present invention.

FIG. 11 is a chart illustrating an example of a IF signal with QPSK modulation scheme where the solid-line stands for the IF signal waveform f(k), the dashed-line stands for the square waveform $g_s(k)$ used for the symbol timing signal to indicate the starting and ending points in counting the zero-crossing points, the circles stand for the zero crossing points and squares stand for the approximate starting points of symbols. The zero-crossings near the symbol transition time periods are ignored in differential phase estimation since they are noisy and not reliable. A field collected QPSK signal was tested for demonstration purposes. The original signal had a sampling frequency of 46,387.33 Hz, a symbol frequency of 11,598 Hz, a center frequency offset of 652 Hz, a root-raised cosine pulse shaping ($\alpha=0.35$) and a signal-to-noise ration of 17 dB. In order to achieve better resolution, the signal in this case was over-sampled to 40 samples per symbol and the center frequency is shifted to a higher rate of $f_c=11,589$ Hz in order to have the better resolution in zero-crossing calculation. Notice that the waveform f(k) does not indicate the signal modulation scheme directly, which is similar to various modulation schemes. The goal of counting the zero-crossing points is to conduct differential phase (which is the feature of the modulation scheme) calculation. The result of the differential phase indicates and classifies the unknown modulation scheme. This chart illustrates the point that better resolution in zero-crossing calculation is achieved because of the relationship between a higher center frequency, an increase in the number of zero-crossing points, resulting in a higher resolution in calculation. The differential phase can be calculated by averaging the time difference of the zero-crossings, x(m, n)−x(m−1, n) between symbols. It should be noted that the zero-crossings near the symbol transition time periods are ignored in differential phase estimation since they are noisy and not reliable.

The present invention also encompasses an automated zero-crossing signal surveillance demodulation and classification device for rapidly identifying an unknown modulation in a signal with many of the same variations and embodiments as the automatic zero-crossing signal demodulation and classification device for rapidly identifying an unknown modulation in a signal.

The present invention also contemplates methods for automatic demodulation and classification of phase shift keying signals with hysteretic differential zero-crossing time samples. The steps of this invention's methods are also depicted by FIG. 10. Referring again to FIG. 10, for a given N, this invention's method commences with the step of inputting known variables, represented by box 41, where values for the $L_s$, weight w(N), and symbol frequency $f_b$ are given as known inputs. During a first calculating step, represented by Box 42, the average number of zero-crossing points per symbol $K_{cb}$ is calculated with a software calculating module. Notice that if an automated histogram normalization procedure is used, the calculation of $k_{cb}$ is not needed. Box 43 represents a timing signal generating step for generating a timing signal g(k), which is then used in the Box 44 step of determining timing indices r(m) and d(m). This invention's method continues with a phase-shifting classification step. In those cases where m equals $L_s$, phase-shifting classification takes place, with PSK denoting phase-shift keying and DPSK denoting differential phase-shift keying. However, in those cases where m is less than $L_s$, this invention's method continues with a counting step, represented by Box 46, for counting the number of zero-crossings N and counting zero-crossing times x(m, 1), x(m, 2), . . . , x(m,N) based on the timing indices r(m) and d(m) depicted in the indexing step represented by Box 47. In a saving step, represented by Box 48, the last zero-crossing times x(m−1, 1), x(m−1, 2), . . . , x(m−1, N) are saved for the further computation. A differential phase y(m) is calculated in a second calculating step, represented by Box 49A, and value z(m) is calculated in a third calculating step, represented by Box 49B, based on a number of symbols $L_s$, weight w(N), symbol frequency $f_b$, and the last and current zero-crossing times counted in the saving step represented by Box 48, which results in a DPSK demodulation output.

Many of the variations and embodiments of the automatic zero-crossing signal demodulation and classification device and automated zero-crossing signal surveillance demodulation and classification device also apply to this invention's methods.

It is to be further understood that other features and modifications to the foregoing detailed description of the automatic zero-crossing signal demodulation and classification devices and methods are within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

What I claim is:

1. An automatic zero-crossing signal demodulation and classification device for rapidly identifying an unknown modulation in a signal, comprising:
   a normalized digitized intermediate frequency (IF) phase-shifted keying signal f(k) is sent to a sample delay circuit and a symbol timing circuit;
   said IF signal having an amplitude, a plurality of random amplitude fluctuations at multiple zero crossing points, a susceptibility to random noise, an unknown center frequency fc and an unknown modulation;
   said sample delay circuit produces a delayed signal fed into a differential phase estimator;
   said differential phase estimator having a plurality of zero-crossing counters and a means for differential phase shift keying;
   said symbol timing circuit, having a means for DC bias sends a symbol timing input to said differential phase estimator and converts said IF signal to a sinusoidal signal g(k);
   said sinusoidal signal g(k) is shifted to said DC bias means and is converted into a square waveform output gs(k);
   said differential phase shift keying means codes said symbol timing input;
   said differential phase estimator calculates a time difference value between a plurality of zero-crossing samples and converts said IF signal to a rectangular waveform fs(k) having a time delay, said time delay synchronizes a plurality of zero-crossing points of a timing waveform g(k);
   said differential phase shift keying means demodulates said delayed signal and said symbol timing input and said differential phase estimator provides a differential phase output to a means for generating an estimated phase histogram;
   said histogram generating means generates an estimated phased histogram and evaluates a plurality of statistical patterns to determine a plurality of modulation types;
   a means for histogram comparison compares said estimated phased histogram to said plurality of known templates from a histogram storage module to determine an optimal match; and
   said histogram comparison means provides a comparison output to a modulation type module, said modulation type module rapidly develops an increased accuracy modulation output that identifies said unknown modulation for a user on a display means.

2. The automatic zero-crossing signal demodulation and classification device for rapidly identifying an unknown modulation in a signal, as recited in claim 1, said differential phase estimator further comprising a hysteresis nonlinear converter, a plurality of trigger logic circuits, an adder and an OR logic.

3. The automatic zero-crossing signal demodulation and classification device for rapidly identifying an unknown modulation in a signal, as recited in claim 2, said symbol timing circuit further comprising an absolute function, a band-pass filter, a phase lock loop, an adder and a relay nonlinear converter.

4. The automatic zero-crossing signal demodulation and classification device for rapidly identifying an unknown modulation in a signal, as recited in claim 3, further comprising:
   a hysteresis converter input being sent to said hysteresis nonlinear converter;
   said square waveform $g_s(k)$ being represented by an H logic state or an L logic state depending upon a sinusoidal waveform polarity of said sinusoidal waveform g(k)
   said hysteresis converter input being increased to an input value greater than or equal to $\alpha$, obtains said logic state H; and
   said hysteresis converter input being decreased to an input value less than or equal to $-\alpha$, obtains said logic state L.

5. The automatic zero-crossing signal demodulation and classification device for rapidly identifying an unknown modulation in a signal, as recited in claim 4, further comprising said hysteresis nonlinear converter converts said delayed signal into a rectangular waveform $f_s(k)$ with a time delay of $\delta = \sin^{-1}\alpha$.

6. The automatic zero-crossing signal demodulation and classification device for rapidly identifying an unknown modulation in a signal, as recited in claim 5, further comprising identifying said unknown modulation from a plurality of non-cooperative cornmunications.

7. An automated zero-crossing signal surveillance demodulation and classification device for rapidly identifying an unknown modulation in a signal, comprising:
   a normalized digitized intermediate frequency (IF) phase-shifted keying signal f(k) is sent to a sample delay circuit and a symbol timing circuit;
   said IF signal having an amplitude, a plurality of random amplitude fluctuations at multiple zero crossing points, a susceptibility to random noise, an unknown center frequency fc and an unknown modulation;
   said sample delay circuit produces a delayed signal fed into a differential phase estimator;
   said differential phase estimator having a plurality of zero-crossing counters and a means for differential phase shift keying;
   said symbol timing circuit, having a means for DC bias sends a symbol timing input to said differential phase estimator and converts said IF signal to a sinusoidal signal g(k);
   said sinusoidal signal g(k) is shifted to said DC bias means and is converted into a square waveform output gs(k);
   said differential phase shift keying means codes said symbol timing input;
   said differential phase estimator calculates a time difference value between a plurality of zero-crossing samples and converts said IF signal to a rectangular waveform fs(k) having a time delay, said time delay synchronizes a plurality of zero-crossing points of a timing waveform g(k);
   said differential phase shift keying means demodulates said delayed signal and said symbol timing input and said differential phase estimator provides a differential phase output to a means for generating an estimated phase histogram;
   said histogram generating means generates an estimated phased histogram and evaluates a plurality of statistical patterns to determine a plurality of modulation types;
   a means for histogram comparison compares said estimated phased histogram to said plurality of known templates from a histogram storage module to determine an optimal match; and said histogram comparison means provides a comparison output to a modulation type module, said modulation types module rapidly develops an increased accuracy modulation output that identifies said unknown modulation for a user on a display means.

8. The automated zero-crossing signal surveillance demodulation and classification device for rapidly identifying an unknown modulation in a signal, as recited in claim 7, said differential phase estimator further comprising a hysteresis nonlinear converter, a plurality of trigger logic circuits, an adder and an OR logic.

9. The automated zero-crossing signal surveillance demodulation and classification device for rapidly identifying an unknown modulation in a signal, as recited in claim 8, said symbol timing circuit further comprising an absolute function, a band-pass filter, a phase lock loop, an adder and a relay nonlinear converter.

10. The automated zero-crossing signal surveillance demodulation and classification device for rapidly identifying an unknown modulation in a signal, as recited in claim 9, further comprising:
a hysteresis converter input being sent to said hysteresis nonlinear converter;
said square waveform $g_s(k)$ being represented by an H logic state or an L logic state depending upon a sinusoidal waveform polarity of said sinusoidal waveform $g(k)$
said hysteresis converter input being increased to an input value greater than or equal to $\alpha$, obtains said logic state H; and
said hysteresis converter input being decreased to an input value less than or equal to $-\alpha$, obtains said logic state L.

11. The automated zero-crossing signal surveillance demodulation and classification device for rapidly identifying an unknown modulation in a signal, as recited in claim 2, further comprising said hysteresis nonlinear converter converts said delayed signal into a rectangular waveform $f_s(k)$ with a time delay of $\delta = \sin^{-1}\alpha$.

12. The automated zero-crossing signal surveillance demodulation and classification device for rapidly identifying an unknown modulation in a signal, as recited in claim 11, further comprising identifying said unknown modulation from a plurality of non-cooperative communications.

13. A method for automatic zero-crossing demodulation and classification of an unknown modulation signal, comprising the steps of:
inputting a plurality of known variables;
forming a sample delay circuit;
forming a symbol timing circuit;
configuring a differential phase estimator;
sending a normalized digitized intermediate frequency (IF) phase-shifted keying signal f(k) to said sample delay circuit and said symbol timing circuit, said IF signal having an amplitude, a plurality of random amplitude fluctuations at multiple zero crossing points, a susceptibility to random noise, an unknown center frequency fc and an unknown modulation;
converting said IF signal into a delayed signal with said sample delay circuit;
feeding said delayed signal fed into said differential phase estimator, said differential phase estimator having a plurality of zero-crossing counters and a means for differential phase shift keying;
sending a symbol timing input to said differential phase estimator from said symbol timing circuit, said symbol timing circuit, having a means for DC bias sends a symbol timing input to said differential phase estimator and converts said IF signal to a sinusoidal signal g(k);
calculating an average number of zero-crossing points;
coding said symbol timing input with a differential phase shift keying means;
shifting said sinusoidal signal g(k) to said DC bias means and converting said sinusoidal signal g(k) into a square waveform gs(k);
calculating a time difference value between a plurality of zero-crossing samples with said differential phase estimator and converting said IF signal to a rectangular waveform fs(k) having a time delay, said time delay synchronizes a plurality of zero-crossing points to generate a timing waveform g(k);
calculating a value z(m) to provide a differential phase output to a means for generating an estimated phase histogram by said differential phase shift keying means demodulating said delayed signal and said symbol timing input;
generating an estimated phased histogram in said histogram generating means;
evaluating a plurality of statistical patterns to determine a plurality of modulation types said histogram generating means;
retrieving a plurality of known templates from a histogram storage module;
comparing said estimated phased histogram to said plurality of known templates;
correlating said estimated phased histogram and said stored plurality of histogram templates with a means for histogram comparison;
determining a best match histogram template;
generating a comparison output to a modulation type module in said histogram comparison means; and
rapidly developing an increased accuracy modulation output that identifies said unknown modulation for a user on a display means.

14. The method for automatic zero-crossing demodulation and classification of an unknown modulation signal, as recited in claim 13, further comprising the step of configuring said differential phase estimator to include a hysteresis nonlinear converter, a plurality of trigger logic circuits, an adder and an OR logic.

15. The method for automatic zero-crossing demodulation and classification of an unknown modulation signal, as recited in claim 14, further comprising the step of forming said symbol timing circuit with an absolute function, a band-pass filter, a phase lock loop, an adder and a relay nonlinear converter.

16. The method for automatic zero-crossing demodulation and classification of an unknown modulation signal, as recited in claim 15, further comprising the steps of:
sending a hysteresis converter input to said hysteresis nonlinear converter; and
representing said square waveform $g_s(k)$ with an H logic state or an L logic state depending upon a sinusoidal waveform polarity of said sinusoidal waveform g(k) said hysteresis converter input being increased to an input value greater than or equal to $\alpha$, to obtain said logic state H and said hysteresis converter input being decreased to an input value less than or equal to $-\alpha$, obtain said logic state L.

17. The method for automatic zero-crossing demodulation and classification of an unknown modulation signal, as recited in claim 16, further comprising the step of converting said delayed signal f(k) into a rectangular waveform $f_s(k)$ with a time delay of $\delta = \sin^{-1}\alpha$ with said hysteresis nonlinear converter.

18. The method for automatic zero-crossing demodulation and classification of an unknown modulation signal, as recited as recited in claim 17, further comprising the step of identifying said unknown modulation from a plurality of non-cooperative communications.

* * * * *